United States Patent
Al-Jarro et al.

(10) Patent No.: US 10,338,956 B2
(45) Date of Patent: Jul. 2, 2019

(54) APPLICATION PROFILING JOB MANAGEMENT SYSTEM, PROGRAM, AND METHOD

(71) Applicant: Fujitsu Limited, Kawasaki-shi, Kanagawa (JP)

(72) Inventors: Ahmed Al-Jarro, London (GB); Sergio Aldea Lopez, London (GB)

(73) Assignee: FUJITSU LIMITED, Kawasaki (JP)

( * ) Notice: Subject to any disclaimer, the term of this patent is extended or adjusted under 35 U.S.C. 154(b) by 71 days.

(21) Appl. No.: 15/639,085

(22) Filed: Jun. 30, 2017

(65) Prior Publication Data

US 2018/0046497 A1 Feb. 15, 2018

(30) Foreign Application Priority Data

Aug. 9, 2016 (DE) .................. 10 2016 214 786

(51) Int. Cl.
| | |
|---|---|
| *G06F 9/48* | (2006.01) |
| *G06F 9/46* | (2006.01) |
| *G06F 9/50* | (2006.01) |
| *G06F 8/41* | (2018.01) |
| *G06F 11/34* | (2006.01) |

(52) U.S. Cl.
CPC ............ *G06F 9/4843* (2013.01); *G06F 8/443* (2013.01); *G06F 9/46* (2013.01); *G06F 9/4881* (2013.01); *G06F 9/50* (2013.01); *G06F 11/3466* (2013.01)

(58) Field of Classification Search
CPC .................................................. G06F 9/4843
See application file for complete search history.

(56) References Cited

U.S. PATENT DOCUMENTS

| | | |
|---|---|---|
| 8,943,479 B1 | 1/2015 | Roskind |
| 2009/0199160 A1 | 8/2009 | Vaitheeswaran et al. |
| 2011/0264410 A1 | 10/2011 | Biberstein et al. |
| 2012/0084028 A1 | 4/2012 | Kumar et al. |
| 2013/0036218 A1* | 2/2013 | Campagnoni ........... H04L 43/14 709/224 |
| 2015/0007198 A1 | 1/2015 | Thomas et al. |

OTHER PUBLICATIONS

Knupfer, A., Rossel, C., Mey, D. a., Biersdorff, S., Diethelm, K., Eschweiler, D., et al. (2011). "Score-P: A Joint Performance Measurement Run-Time Infrastructure for Periscope, Scalasca, TAU, and Vampire", Tools for High Performance Computing, 79-91.
Mohr. B., & Wolf, F. (2003). "KOJAK—A Tool Set for Automatic Performance Analysis of Parallel Programs", (pp. 1301-1304).
Extended European Search Report dated Nov. 29, 2017 in corresponding European Patent Application No. 17185021.7, 8 pages.
German Search Report dated Jun. 29, 2017 in German Patent Application No. 10 2016 214 786.2.

* cited by examiner

*Primary Examiner* — Charlie Sun
(74) *Attorney, Agent, or Firm* — Staas & Halsey LLP

(57) ABSTRACT

An application profiling system, initiating profiling a software application; including: apparatus to receive user input information of a software application profiling target and execution requirements, to store profiler specifications; to determine which profiler satisfies the execution requirements, based on the specifications, and to generate needed profiling tasks, each task specifying an application profiler; to select hardware resources the tasks; and to initiate execution of the tasks.

15 Claims, 8 Drawing Sheets

APPLICATION PROFILING JOB MANAGEMENT SYSTEM, PROGRAM, AND METHOD

CROSS-REFERENCE TO RELATED APPLICATIONS

This application claims the benefit of German Application No. 102016214786.2, filed Aug. 9, 2016, in the German Intellectual Property Office, the disclosure of which is incorporated herein by reference.

BACKGROUND

1. Field

The embodiments lie in the field of software profiling, and in particular, relates to a system for scheduling profiling tasks utilizing multiple profilers.

2. Description of the Related Art

Profiling technology software tools are used to analyze the performance of codes and software applications. These tools are typically not straightforward to use and often require extensive knowledge of their inner workings/functionalities by the user. Furthermore, for the complete/thorough analysis of software applications, different tools or application profilers are typically required. Each individual application profiler available to a user offers a distinctive interface to its operation, and therefore requires different expertise and a different approach for its configuration and execution. Due to each profiler's unique operating characteristics, the learning process and knowledge required of the working details for configuring and running a profiler, or for the selection of an appropriate profiler, typically places the user on a steep learning curve that can adversely impact their work productivity.

Therefore, a provision for a mechanism that can automate the execution of application profilers and/or customize the profiling process to operate/include a selection of profiling technologies is regarded as highly beneficial.

SUMMARY

Additional aspects and/or advantages will be set forth in part in the description which follows and, in part, will be apparent from the description, or may be learned by practice of the embodiments.

Embodiments include an application profiling job management system, configured to compose and initiate one or more application profiling tasks for profiling a software application; the application profiling job management system comprising: a user input receiver configured to receive user input information, wherein the user input information specifies a profiling target and profiling execution requirements, the profiling target comprising the software application; a profiler specification storage unit configured to store a profiler specification of each of a plurality of application profilers accessible to the application profiling job management system; a profiler matching unit configured to determine which of the plurality of application profilers satisfy the specified profiling execution requirements, based on the respective profiler specifications, and for each of the application profilers determined to satisfy the specified profiling execution requirements, to generate one or more application profiling tasks, each application profiling task specifying the application profiler from among the plurality of application profilers and the profiling target; a hardware management unit configured to select one or more systems of hardware resources and/or processors to perform each of the application profiling tasks; and a job scheduler configured to initiate execution of each of the one or more application profiling tasks with the respective selected one or more systems of hardware resources.

Embodiments provide an effective, user friendly, customizable and automated mechanism for using and applying application profilers to analyze the performance of profiling targets. Such embodiments provide a user input receiver for configuring the computing environments, the application profilers, and the execution thereof. The user input receiver may be a command line or GUI interface, and can handle any special entries, for example, for loading certain dependent software artifacts that may be required (i.e. a specific script to handle how an application is submitted into a queue system). The resulting user input information is responsible for executing the appropriate application profilers. The primary task of the user input receiver is therefore to translate the desired user input information, as set by the user, into appropriate profiling execution requirements for each application profiler regardless of how each application profiler is eventually called for.

Each application profiler is considered an independent module since the fine details required for each profiler's execution are encapsulated individually in application profiler driver script templates. Additionally, for user input information where different profiling execution requirements are specified, with the aim of gaining a more in depth and comprehensive understanding of the profiling target's performance, such embodiments offer an easy to use and customizable mechanism that reduces and simplifies such processes to a seamless one.

An independent module is taken to be an individual application profiler which is described by an application profiler driver script template, where this template is comprised of a structured format of instructions which define how an individual application profiler is executed on a system of hardware resources.

Embodiments provide code developers and software users with an automatic, transparent, customizable and easy to use system for performing application profiling. This technology is designed to unify the details required to configure, run and initiate execution of various application profilers, enabling the user to perform multi-aspect profiling of a profiling target in a seamless manner. Therefore, comprehensive and complete profiling of a profiling target, including High Performance Computing (HPC) applications and executables (where high performance computing includes the use of parallel processing for running advanced application software in a reliable and timely manner), can be performed in a unified step that is both effective and efficient.

This application profiling job management system reduces the execution of application profilers to a concise process, whereby a range of detailed application profiler configuration options are reduced to an intelligible set of input options which enables a user to perform comprehensive profiling of profiling targets.

Embodiments provide a means for allowing the user to profile more than one instance of a profiling target by providing a unified user input receiver with multiple different user input information settings for executing one application profiler, or a selection of application profilers, on a plurality of profiling target instances. Such embodiments also provide an effective mechanism for considering scenarios where different versions of the same profiling target instance are to be profiled. These different profiling target instances may vary in how they run, so different hardware resource settings and/or profiling execution requirements would have to be applied for each instance before obtaining their respective profiles. As the number of different instances of a profiling target increases, the profiling process becomes increasingly exhaustive (this may require different environment settings, modules and system libraries to be loaded and pre-configured). Embodiments reduce this involved process to an automatic, seamless and transparent one.

Moreover, for profiling targets that have already been compiled on the same system of hardware resources where the application profilers are to be used, the system of hardware resources then only requires access to the binary executable, and not to the source code, as long as the binary files of the profiling targets are compatible for execution on the target system of hardware resources. In such a case, embodiments do not require the user to modify or augment the source code of the profiling target.

A compiled profiling target is taken to be a profiling target that has been run on a computing system whereby a compiling tool has translated the profiling target source code into machine code to be executed directly by a computer's central processing unit (CPU).

The outcomes of embodiments are beneficial to the wider HPC and software programming communities, and include the following:

a) An automatic and customizable mechanism for application profiling using different application profilers with multiple profiling execution requirements.

b) The profiling of profiling targets in an efficient and effective manner, since it overcomes the time-consuming task of setting all the possible combinations required to execute profiling targets using an application profiler or multiple application profilers.

c) Transparency to the user, since it hides the cumbersome details required for executing and configuring each application profiler, as well as the target computing system(s).

d) Abstraction of technical details, where the application profilers are executed in a seamless manner while the resulting profiling output of each application profiling task is stored and kept intact.

e) A comprehensive and complete characterization of profiling targets while significantly reducing the time required, as well as avoiding the steep learning process required, to configure and execute multiple computing systems and application.

As is often the case when profiling either a single profiling target or a collection of different profiling targets, extensive user knowledge is required. Therefore, the embodiments significantly enhance the users' existing knowledge and increases the usability of both software and hardware systems (for example, HPC) when selecting and suggesting application profilers. Moreover, embodiments may include a mechanism for suggesting alternative suitable application profilers that the user may not be aware of by other means.

Embodiments enable seamless execution of different combinations of profiler-system-application-experiments, and gather the resulting outputs in a common storage location to be subsequently combined and thereafter analyzed.

A software/target application is taken to be at least an executable portion of code implementing the software/target application that can run on one or more computing environments and/or processors.

A profiler specification may also be referred to as a profiler descriptor.

A hardware artifact map may also be referred to as a system descriptor.

Optionally embodiments further comprise a hardware artifact map storage unit configured to store, for the or each of one or more systems of hardware resources, a hardware artifact map specifying a location of each of a plurality of software artifacts stored by the respective system of hardware resources; and an assembly unit configured to assemble, for each application profiling task, a set of software artifacts upon which the specified application profilers indicate a dependency, by using the stored hardware artifact map for the selected system of hardware resources to access the location of the set of software artifacts.

The hardware artifact map provides a mechanism for identifying any software artifacts that are required by the application profiler in order to execute the application profiling task specified by the user input information. These dependent software artifacts may be embodied as configuration libraries, linker scripts, device drivers, object files, binaries, scripts and/or boot code which performs hardware initialization.

The hardware artifact map allows for additional application profilers to be incorporated into the application profiling job management system, by adding paths for any new software artifacts of new application profilers to the existing hardware artifact map, and thereby limiting the extent of modification or alteration required of the systems of hardware resources. Furthermore, the hardware artifact map facilitates execution of an application profiling task on the systems of hardware resources for all compatible combinations of different application profilers and/or profiling target instances.

The assembly unit takes the one or more software artifacts which are required by the application profiler to perform the respective application profiling task and may combine them into a single executable file, library file or another object file. The assembling may be performed by dynamic linking, whereby a standard system library is utilized, or static linking where a system library is not required.

Furthermore, each of the hardware artifact maps may include, for the respective system of hardware resources, one or more hardware storage identifiers linked to data indicating the location of specified software artifacts on the hardware resource to be assembled by the assembly unit for execution of the one or more application profiling tasks.

The software artifacts identified by the hardware artifact map may be located in the secondary memory/non-volatile memory/Read Only Memory (ROM) of the computer system (e.g. PROM, EPROM and/or EEPROM). The hardware storage identifier may be embodied as a memory address or a path to a memory address.

By linking all hardware storage identifiers on a system of hardware resources to the same dependent software artifact, only one copy of each dependent software artifact is required on any one system of hardware resources, and thereby the memory capacity required for each individual hardware resource is reduced.

Optionally, each of the profiler specifications includes, for the respective application profiler, a plurality of profiler information identifiers each of which identifies a profiling value range indicating a performance measurement available from the application profiler and/or indicating one or more software artifacts required by the specified application profiler.

The profiler information identifiers provide a mechanism for indicating characteristics such as the profiling capabilities (i.e. a performance measurement) and the execution requirements (i.e. the software artifacts) associated with each of the respective application profilers. These characteristics may by changed as and when an application profiler is updated or modified without having to reinstall the application profiler into the application profiling job management system.

The profiler information identifier and profiling value range may be embodied as a key-value pair (KVP) structure, where a key is represented by a profiler information identifier and a value is represented by a profiling value range. Instances of a profiler information identifier and profiling value range may be: name-value pair, field-value pair or attribute-value pair.

The one or more software artifacts which are required by the specified application profiler is taken to mean the software artifacts which are required for each application profiling task to be assembled by the assembly unit and executed on the one or more systems of hardware resources.

Furthermore, the profiler matching unit may also include a translation unit configured to translate the profiling execution requirements specified by the user input information into a plurality of requirement value ranges, each requirement value range identified by a requirement information identifier, and each requirement information identifier having an associated profiler information identifier, wherein the profiler matching unit is configured to compare the respective profiler specifications to the specified profiling execution requirements by comparing value ranges for associated profiler information identifier-requirement information identifier pairs.

The translation unit provides a mechanism for direct comparison of profiling execution requirements with profiler specifications, by mapping each requirement information identifier to a profiler information identifier. The translation unit may be embodied by a processor operating in cooperation with a stored list of associations, or mapping, between requirement information identifiers and profiler information identifiers. The translating performed by the translation unit may be referred to as re-categorization, formalization, mapping, or re-structuring. Thus, the translation unit may be considered to be a unit configured to restructure the profiling execution requirements according to a stored structure, the stored structure being the structure by which the profiler specifications are stored.

The translation unit allows user requirements (represented by profiling execution requirements) to be directly compared with features of the profilers (represented by profiler information identifiers and the respective values). The profiler matching unit is thereby provided with directly comparable datasets (profiling execution requirements and profiler specification) with which to perform the determination of which of the plurality of application profilers satisfy the specified profiling execution requirements.

Optionally, the profiler matching unit is further configured to determine which of the plurality of application profilers satisfy the specified profiling execution requirements by:

for the profiler specification of each application profiler:
determining whether the associated profiler information identifier identifies a profiling value range that fulfils the identified requirement value range for each requirement information identifier, wherein the application profiler is determined to satisfy the specified profiling execution requirements if the identified requirement value ranges are fulfilled.

The profiler matching unit compares profiling value ranges against individual requirement value ranges in an iterative process whereby if any one requirement value range does not correlate with any of the plurality of profiler value ranges stored in the profiler specification the respective profiler specification is discarded.

The profiler matching unit ensures that only application profilers which fulfill a specified proportion or more of the identified requirement value ranges for each requirement information identifier are selected to perform profiling of the profiling target, and thereby compiles the most efficient arrangement of profilers for profiling a profiling target.

The profiler matching unit may further comprise a mechanism for checking any licenses of application profilers that are selected and subsequently verify the availability of an application profiler based on this license.

The specific proportion or more of profiling execution requirements to be satisfied for an application profiler to be selected may be, for example, 75%, 9/10, and/or user configurable. That is to say, the specified proportion of the identified requirement value ranges that must be fulfilled in order for an application profiler to be determined to satisfy the specified profiling execution requirements is, for example, a specified percentage (such as 75%), a specified number (such as 9/10), or a proportion specified in some other way, wherein the proportion may be specified by the user as an input.

A profiling range that fulfils the identified requirement value range is taken to mean that the profiling range falls within or satisfies the identified requirement value range.

Optionally, the application job management system is configured to store an application profiler driver script template defining a structured format for instructions determining configuration of a system of hardware resources executing the application profiler; and the assembly unit includes a driver script storage unit configured to store an application profiler driver script for each of the plurality of application profilers accessible to the application profiling job management system, wherein each of the application profiler driver scripts implements the structured format defined by the application profiler driver script template.

The application profiler driver script template determines the configuration of a system of hardware resources responsible for performing the application profiling of profiling targets by loading different libraries and executable modules, and optionally also determines where the resulting outputs are finally collected and stored.

The application profiler driver script template may be a modular mechanism that allows for additional profilers to be incorporated into the application profiling job management system, as well as for existing application profilers to be removed, without affecting any other features of the application profiling job management system, and thereby removing any restriction on the number of application profilers that may be used at any one time.

Each of the profiler specifications may further include, for the respective application profiler, a priority indicator value for indicating the order in which a group of application profilers should be executed during the execution of an application profiling task, whereby higher priority indicator values are executed before lower priority indicator values, wherein the priority indicator values are based on operational requirements and/or interdependencies between a sequence of application profilers which require some application profilers to be executed earlier in the sequence than others, and the value stored by the priority indicator value is configurable by a user.

By taking into account factors such as the order in which application profilers need to be executed in when setting the priority indicator values, software conflict errors may be prevented (e.g. when two programs compete for the same memory resource and or register). Furthermore, the user may choose to set the priority indicator values to execute application profilers in a particular order, so as to ensure application profilers that are capable of performing the most exhaustive and thorough profiling are executed before other application profilers which have a more niche application.

A priority indicator is taken to be a value assigned to each individual application profiler in order to indicate its preference in relation to other application profilers. The priority value may be, for example, a value from 1 to 100, and the order of preference may be either ascending or descending. The priority values may be configurable, for example, by a system administrator.

Optionally, the hardware matching unit is configured, in a case in which the profiler matching unit determines a plurality of application profiling tasks, to scan the plurality of application profiling tasks to identify interactions, and to divide the plurality of application profiling tasks into one or more batch jobs including grouping identified interacting application profiling tasks into the same batch job; and to select one or more systems of hardware resources from the one or more computing environments and/or processors to perform each of the application profiling tasks by selecting an independent system of hardware resources for each of the one or more batch jobs.

The hardware matching unit coordinates batches of jobs of application profiling tasks to be executed in parallel on independent computing environments. In the case where there are multiple profiling jobs to be executed, a parallel execution to them can be used. In this parallel execution, we mean that independent profiling jobs can be executed on independent computing environments. By breaking down the profiling process, which can generate several profiling tasks, it can speed up the overall profiling process via executing them in parallel. Aside from the parallelization of the profiling jobs, the software to be profiled can contain parallel processing, which is preserved in the profiling jobs (this would have been a prior knowledge of the application to be profiled and would have previously been setup by the user before applying any profiling).

The availability of independent systems of hardware resources allow for different types of profiling jobs to be independently executed. This further includes the profiling of multiple parallel processing including, for example: multi-core computing, symmetric multiprocessing, distributed computing, cluster computing, grid computing and/or vector processing.

An independent system of hardware resources is taken to be a system of hardware resources that are independent from other systems of hardware resources, with independent denoting, for example, that they do not share the same processor(s) or violate any rights of access to any other computing resource including, for example: processing, all memory hierarchy, network communications, storage, input/output operations, etc.

A job is taken to be a profiling target that has been matched with one or more application profilers based on a set of profiling execution requirements and an indication of which system of hardware resources the profiling will be executed on. A job may also be embodied as a profiler-system-application-experiment combination. Furthermore, in certain embodiments the hardware resources and profiling target may be profiled individually whereby performance characteristics of the hardware resource or profiling target are determined as separate outputs. These separated hardware resource and profiling target jobs may be embodied as a profiler-system-experiment combination and a profiler-application-experiment combination respectively.

Embodiments may also include a computing system comprising: an application profiling job management system according to any of the previous claims; a job scheduler as defined above; and one or more systems of hardware resources, wherein each of the systems of hardware resources is configured to execute an application profiling task in accordance with the instructions of the job scheduler.

Embodiments of another aspect include an application profiling job management method, for composing and initiating one or more application profiling tasks for profiling a software application; the application profiling job management method comprising: receiving user input information, wherein the user input information specifies a profiling target and profiling execution requirements, the profiling target comprising the software application; storing a profiler specification of each of a plurality of application profilers accessible to the application profiling job management system; determining which of the plurality of application profilers satisfy the specified profiling execution requirements, based on the respective profiler specifications, and for each of the application profilers determined to satisfy the specified profiling execution requirements, generating one or more application profiling tasks, each application profiling task specifying the application profiler from among the plurality of application profilers and the profiling target; selecting one or more systems of hardware resources and/or processors to perform each of the application profiling tasks; and initiating execution of each of the one or more application profiling tasks with the respective selected one or more systems of hardware resources.

Embodiments of another aspect include a computer program which, when executed by a computing device, causes the computing device to execute a method of an embodiment.

Such a computing device may be a controller or management system of a system of shared computing hardware resources, such as cloud computing infrastructure.

BRIEF DESCRIPTION OF THE DRAWINGS

A detailed description of the embodiments will now be provided, with reference to the accompanying drawings in which.

DETAILED DESCRIPTION

Figure 1:
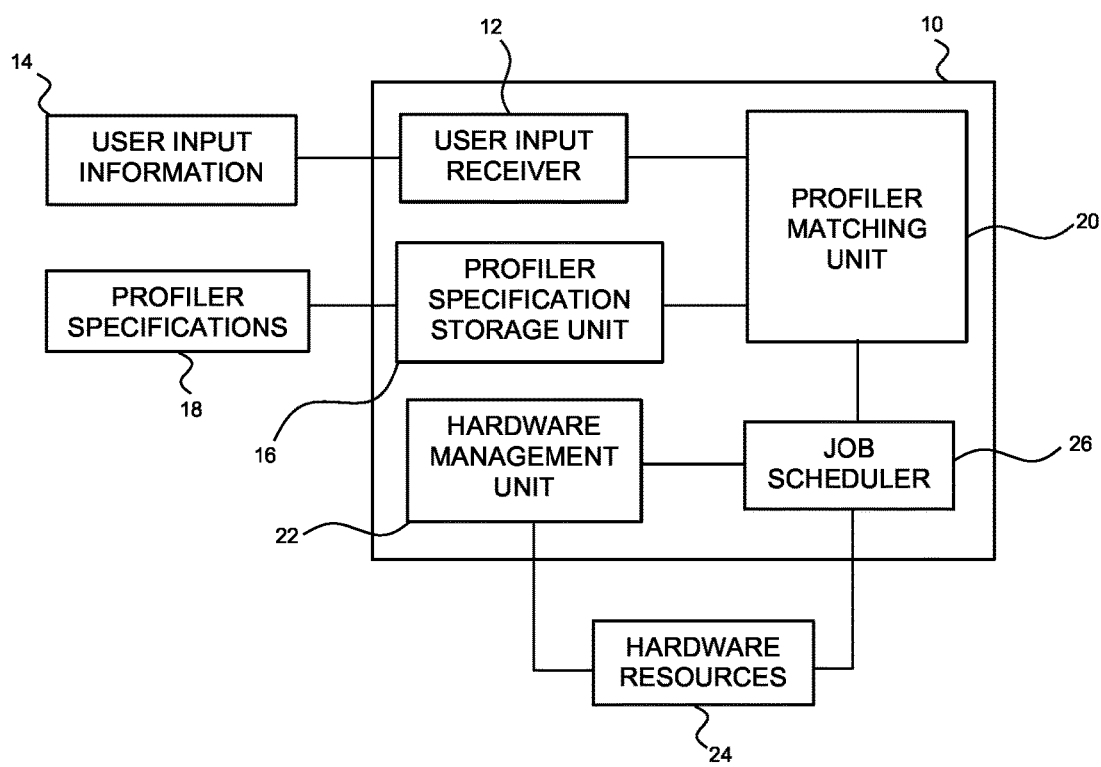
FIG. 1 is a schematic diagram of an application profiling job management system.

Reference will now be made in detail to the embodiments, examples of which are illustrated in the accompanying drawings, wherein like reference numerals refer to the like elements throughout. The embodiments are described below by referring to the figures.

FIG. 1 illustrates an application profiling job management system 10. The system 10 includes a user input receiver 12, a profiler specification storage unit 16, a profiler matching unit 20, a hardware management unit 22 and a job scheduler 26. The lines between the units represent the transfer of information between one another. Other exchanges of data beyond those illustrated may also occur, where the illustration represents specific data exchanges, as detailed below.

The user input receiver 12 is configured to receive user input information 14, wherein the user input information 14 specifies a profiling target and profiling execution requirements, and the profiling target comprises a software application to be profiled.

The user input receiver 12 is configured to receive input data, and may be implemented as a software module executed by a processor. For example, the user input receiver 12 may be a user interface such as a graphical user interface, and may receive input from a user via any suitable input device, including but not limited to a keyboard, a pointing device, a mouse or a touchscreen. Furthermore, the input may be submitted to the user input receiver 12 over a network from a user terminal. The user input information 14 may be sent to the user input receiver in real time 12 as user information is entered into the graphical user interface, or it may be held in a computing environment until a signal is received from the user indicating that the information is ready to be sent, at which point the entered user input information 14 is sent to the user input receiver 12. Upon receipt of the user input information 14, the user input receiver 12 may store the entirety of the user input information 14 in a first dedicated memory location on the computing environment that is accessible to the application profiling job management system 10, before the user input information 14 is processed. Alternatively, the user input information 14 may be processed as it is received by the user input receiver 12 sequentially, such that each piece of the user input information 14 is stored temporarily in the first dedicated memory location before being processed.

The user input receiver 12 may process the user input information 14 by parsing. For example, the user input information 14 may be analyzed to identify the profiling target that is to be profiled and profiling execution requirements selected by the user for performing specific profiling tasks. The profiling target and profiling execution requirements may then be extracted by the user input receiver 12 and stored in a second dedicated memory location, separate from the first memory location. Alternatively, the extracted information may be stored in the first dedicated memory location thereby overwriting the previously received unparsed user input information 14. After being parsed, the user input information 14 may be transmitted to the profiler matching unit 20 or may remain stored in the first/second dedicated memory location which is accessible by the profiler matching unit 20. The user input information 14 may be in the form of user profiling preferences and an indication of the particular profiling target intended for profiling. The user input receiver may be implemented by a processor. For example, the processor may execute processing instructions stored on a memory in order to provide the functionality of the user input receiver, and may store data before, during, and after processing on a memory, so that in certain implementations the user input receiver is implemented as a processor and a memory.

The processing capability can be implemented as one or a plurality of processors, including but not limited to one or more central processing units (CPUs). The memory may comprise a non-volatile storage unit such as Erasable Electronic Programmable Read Only Memory (EEPROM) or a volatile storage unit such as random access memory (RAM).

The profiler specification storage unit 16 is configured to store a profiler specification 18 of each of a plurality of application profilers accessible to the application profiling job management system 10.

The profiler specification storage unit 16 stores a plurality of profiler specifications 18 of corresponding application profilers for performing profiling of a user selected profiling target. The profiler specifications 18 may be installed onto the profiler specification storage unit 16 by the user or, for example, by a system administrator. The specification storage unit 16 may be used as a profiler specification library in which a collection of profiler specifications 18 are stored thereby providing a variety of profiling options to the user at all times. Profiler specifications 18 may alternatively be installed onto the profiler specification storage unit 16 in a selective manner such that the number of installed profiler specifications 18 is limited to a number of profilers that would perform a detailed profiling analysis of a particular profiling target. The profiler specification storage unit 16 is accessed by the profiler matching unit 20 allowing suitable profiler specifications 18 to be selected, as discussed below.

The profiler specification storage unit 16 may comprise a volatile or non-volatile memory storing data encoding the profiler specifications 18. The profiler specification storage unit may also comprise a controller or management unit, which controller or management unit may be implemented by a processor executing stored processing instructions.

A profiler is a software tool comprising computer software made up of a collection of processing instructions (including interconnected algorithms and/or messaging protocols) configured to dynamically analyze computer programs (wherein a computer program is an example of a software application serving as a profiling target). The profiler collects data of program events occurring during execution of the computer programs being analyzed and measures parameters including but not limited to memory usage, execution speed, execution efficiency, frequency of function calls, network topology and CPU affinity, where CPU affinity measures how processing instructions are distributed across a plurality of processors. The results of these measurements are then supplied to a user for the purpose of aiding program optimization. Certain trigger events during execution may cause messages representing the trigger event to be generated by the profiler and added to a log (i.e. a text file or equivalent recording profiling information).

The profiler matching unit 20 is configured to determine which of the plurality of application profilers satisfy the specified profiling execution requirements, based on the respective profiler specifications 18, and for each of the application profilers determined to satisfy the specified profiling execution requirements, to generate one or more application profiling tasks, each application profiling task specifying the application profiler from among the plurality of application profilers and the profiling target.

The profiler matching unit 20 accesses the parsed user input information 14 stored in the user input receiver 12 and the plurality of profiler specifications 18 stored in the profiler specification storage unit 16. The parsed user input information 14 and profiler specifications 18 are analyzed by the profiler matching unit 20 by comparing the individual profiling execution requirements against the parameters of each profiler specification. Based on this comparison, a list of profiler specifications 18, and their corresponding application profilers, is identified by the profiler matching unit 20 as having profiling characteristics that match the profiling execution requirements extracted from the input information 14 during parsing. This list of identified application profilers is subsequently used by the profiler matching unit 20 to generate a list of application profiling tasks, wherein each application profiling task specifies the application profiler that has been identified as being the application profiler that satisfies a particular profiling execution requirement and the profiling target to be profiled. This list of application profiling tasks is then passed to the job scheduler 26.

The profiler matching unit 20 is a functional unit that may be implemented as a processor executing processing instructions stored on a memory, said instructions causing the processor to perform the functionality attributed to the profiler matching unit, including to generate the list of application profiling tasks based on the parsed user input information 14 and the profiler specifications 18. The profiler matching unit 20 may store data before, during, and after processing on a memory, so that in some implementations the profiler matching unit 20 is implemented as a processor and a memory.

The hardware management unit 22 is configured to select one or more systems of hardware resources 24 and/or processors to perform each of the application profiling tasks.

The hardware management unit 22 monitors the systems of hardware resources 24 which can be accessed by the application profiling job management system 10 and identifies which systems of hardware resources 24 are occupied by other processing tasks, either by the application profiling job management system 10 itself or other software resources, and are therefore unavailable for the purpose of executing application profiling tasks received from the profiling matching unit 10. After identifying which systems of hardware resources 24 are available for executing application profiling tasks, the hardware management unit 22 passes the location, that is, a pointer to the physical address, of these available systems of hardware resources 24 to the job scheduler 26, where each system of hardware resources is allocating a job or part of a job.

The hardware management unit 22 is a functional unit that may be implemented as a processor executing processing instructions stored on a memory, said instructions causing the processor to identify which systems of hardware resources 24 are available, for executing profiling tasks, from the pool of systems of hardware resources 24 available to the application profiling job management system 10. The hardware management unit 22 may store data before, during, and after processing on a memory, so that in some implementations the hardware management unit 22 is implemented as a processor and a memory.

The job scheduler 26 is configured to initiate execution of each of the one or more application profiling tasks with the respective selected one or more systems of hardware resources.

The job scheduler 26 receives the location of available systems of hardware resources 24 from the hardware management unit 22 and assigns one or more of the available systems of hardware resources 24 to each application profiling task such that the plural application profiling tasks resulting from a single submitted job may be executed in parallel across the one or more assigned systems of hardware resources 24. The application profiling tasks may be executed in parallel across a single system of hardware resources 24 (assuming that there is not conflict with respect to hardware resources usage) or across a plurality of systems of hardware resources 24. Furthermore, it may be that an individual application profiling process is required to measure several different metrics that could be run independently as several tasks; then concurrent procedure by independently executing these several tasks in parallel is possible, which will speed up the profiling process.

The job scheduler 26 is a functional unit that may comprise a processor executing processing instructions stored on a memory, said instructions causing the processor to assign available systems of hardware resources to profiling tasks for the purpose of executing said profiling tasks. The job scheduler 26 may store data before, during, and after processing on a memory, so that in some implementations the job scheduler 26 is implemented as a processor and a memory.

The application profiling job management system 10 may begin the profiling process by reading and validating the user input information 14. This user input information 14 dictates the particular profiling targets to be profiled as well as the profiler execution requirements under which the application is to be run (such as datasets and number of threads and/or MPI processes etc.). The user input information 14 is parsed in order to extract the profiler execution requirements. These profiler execution requirements are similar to the profiler specifications 18 and the hardware artifact maps, however, the profiler execution requirements may be temporary and therefore do not have to be stored in a file. If there is an error during this parsing process, for example, when a non-expected argument is input by the user, the error is communicated back to the user and the parsing process stops. Otherwise, the application profiling job management system 10 continues on to select the appropriate application profilers for execution.

Figure 2:
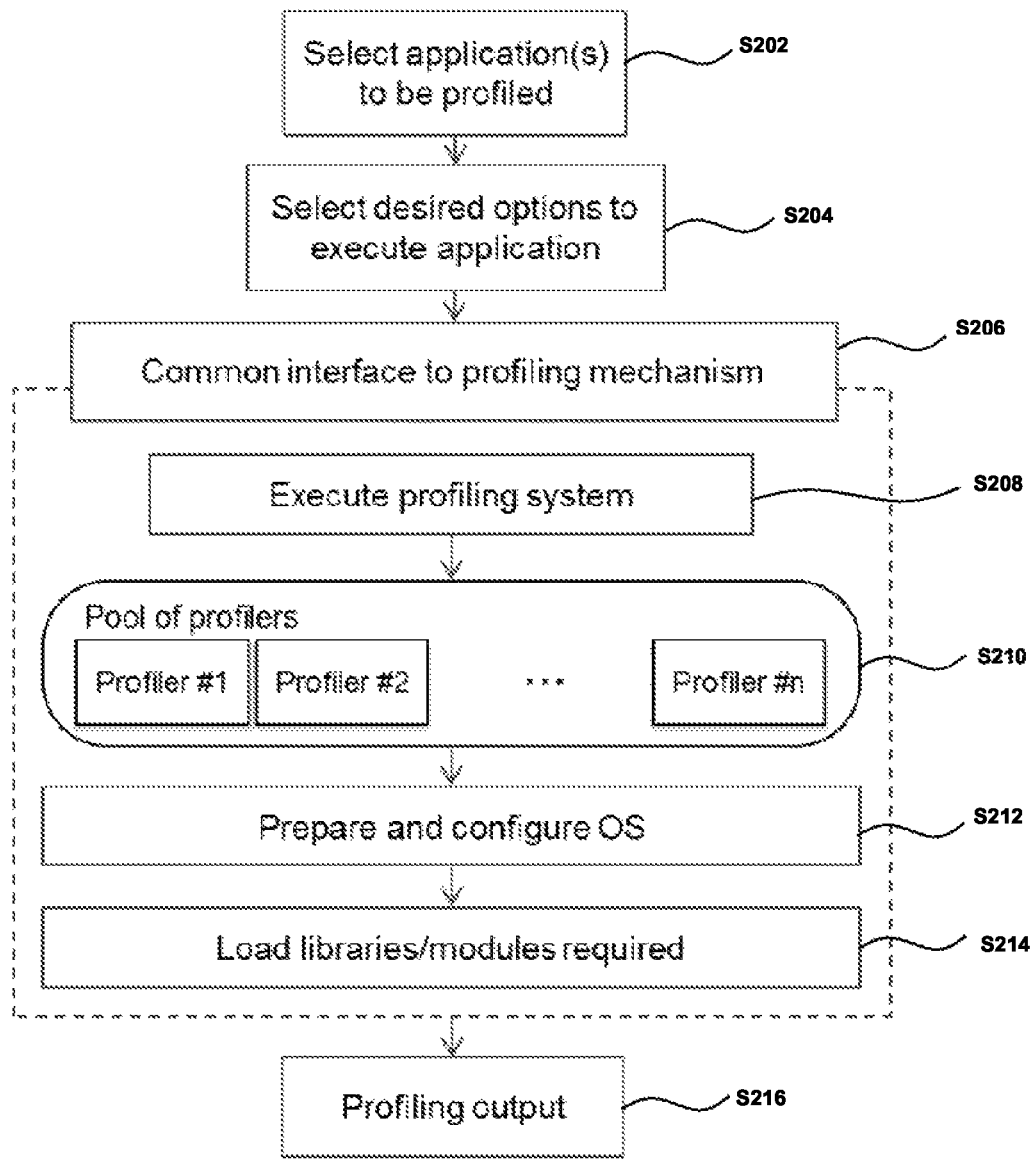
FIG. 2 is a flowchart showing an overview of a process performed by an application profiling job management system.

FIG. 2 is a flowchart illustrating the overview of an embodiment of the application profiling job management system 10 such as that illustrated in FIG. 1. FIG. 2 illustrates a representation of profiling a software application using the application profiling job management system 10.

At steps S202 and S204 user input information 14 is received by the user input receiver 12 and the application(s) to be profiled are selected, the application(s) being software application(s) representing profiling targets, and the desired profiling execution requirements for executing the profiling of the selected profiling target(s) are set. The profiling execution requirements are further described in FIG. 3. The user may, for example, have different versions or instances of the same profiling target which may require different systems of hardware resources 24 to be selected, and/or different profiling execution requirements to be applied. Therefore, steps S202 and S204 are performed before the application profilers are selected and executed.

After the profiling execution options are set and the profiling target(s) have been selected, the automated profiling mechanism takes place between steps S206 and S214, where the automated profiling mechanism is a mechanism comprising the profiler specification storage unit 16, the profiler matching unit 20, the hardware management unit 22 and the job scheduler 26, and is an exemplary implementation of those components. The automated profiling mechanism executes the appropriate profilers that have been identified as satisfying the specified profiling execution requirements, set by the user. Execution of each application profiler is performed via the common interface at step S206 that facilitates loading and executing of each of the appropriately selected application profilers, at steps S208 and S210, preparing and configuring the operating system(s), at step S212, and loading libraries and/or modules required for execution of the application profilers, at step S214. Furthermore, status and error codes are internally defined and monitored within the application profiling job management system 10 in order to handle any potential undesirable outputs, behaviors or errors from each application profiler.

Upon completion of the automated profiling mechanism between steps S206 and S214, the resulting profiling outputs are stored in a temporary location, at step S216, on any suitable computing environment, which may be any systems of hardware resources 24 and/or processors to which the application profiling job management system 10 has access to. Each profiling task may be executed sequentially such that the user input information 14 and the automated profiling mechanism information from previous profiling tasks is overwritten by pending profiling tasks when the pending profiling tasks is executed. Once the job scheduler 24 has finished scheduling jobs and all scheduled jobs have been executed, the overall results are gathered and saved either in a default location or in a location selected by the user that may be determined when the user input information 14 is received by the user input receiver 12 at steps S202 and S204.

Figure 3:
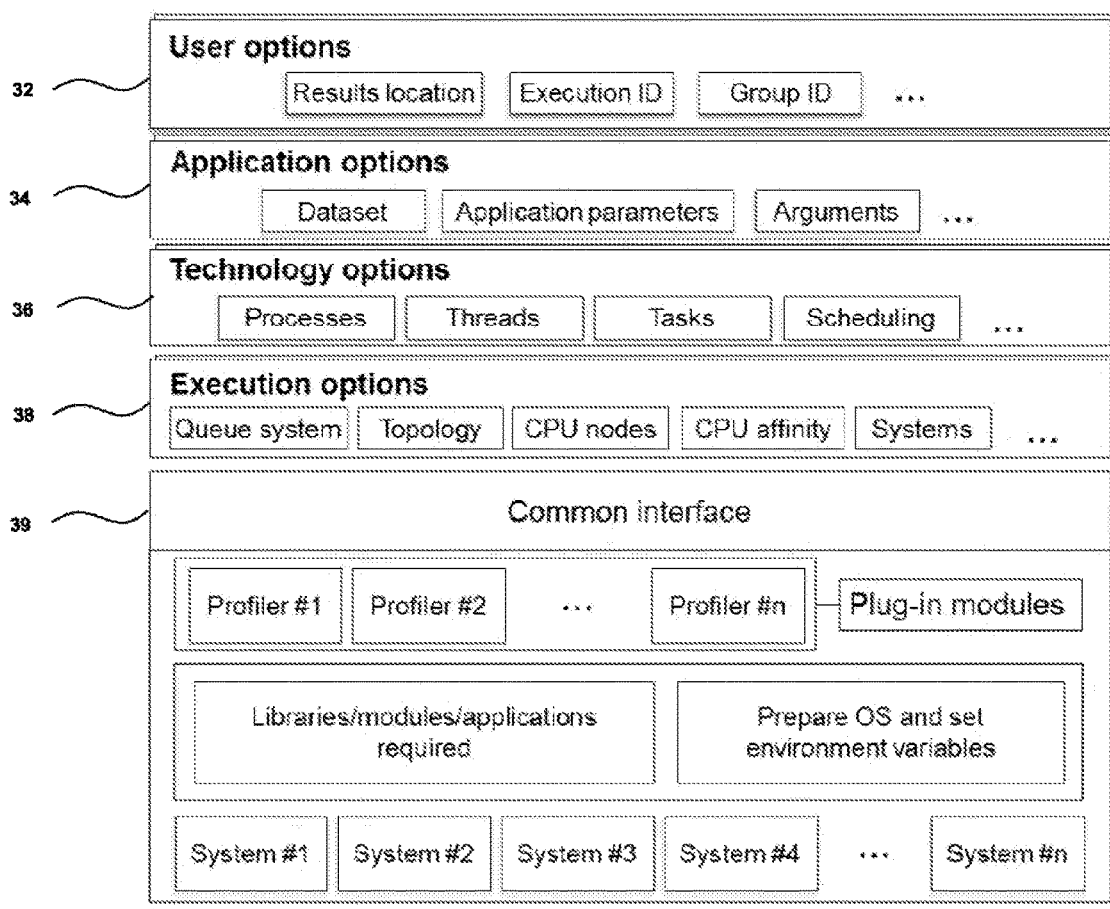
FIG. 3 illustrates options available to a user at the set up stage of a profiling job.

FIG. 3 illustrates some of the various user input options 14 available to the user at the set up stage of the application profiling job management system 10, where the set up stage is exemplary of the user input information 14 being sent to the user input receiver 12, for example the common interface 39 of FIG. 3. Each of the user input options 12 may be profiling execution requirements classified into four categories, as follows:

1) User Storage Options 32

Examples of profiling execution requirements that may be included in this category include: specifying the parent folder in which the generated profiling outputs are to be stored, specifying the ID name for each profiling task and specifying an ID name for a set of profiling tasks.

2) Application(s) Options 34

Examples of profiling execution requirements that may be included in this category include: defining dataset(s), lists of arguments and parameters used that are specific to a set of profiling targets at hand.

3) Technology Options 36

Examples of profiling execution requirements that may be included in this category include: listing details of the number of processes, threads, tasks or scheduling options for the specific HPC technologies to be considered during profiling. The types of HPC technologies to be considered may include, for example, Message Passing Interface (MPI) (parallel computing between processors of computer clusters) or Open Multi-Processing (OpenMP) (parallel computing between processors with shared memory e.g. Dual Core).

4) Execution Options 38

Examples of profiling execution requirements that may be included in this category include: details on how application(s) are to be run on the desired pool of chosen systems of hardware resources 24. For example, distributed and/or communication topology, number of CPU nodes, CPU affinity and queuing systems.

Figure 4:
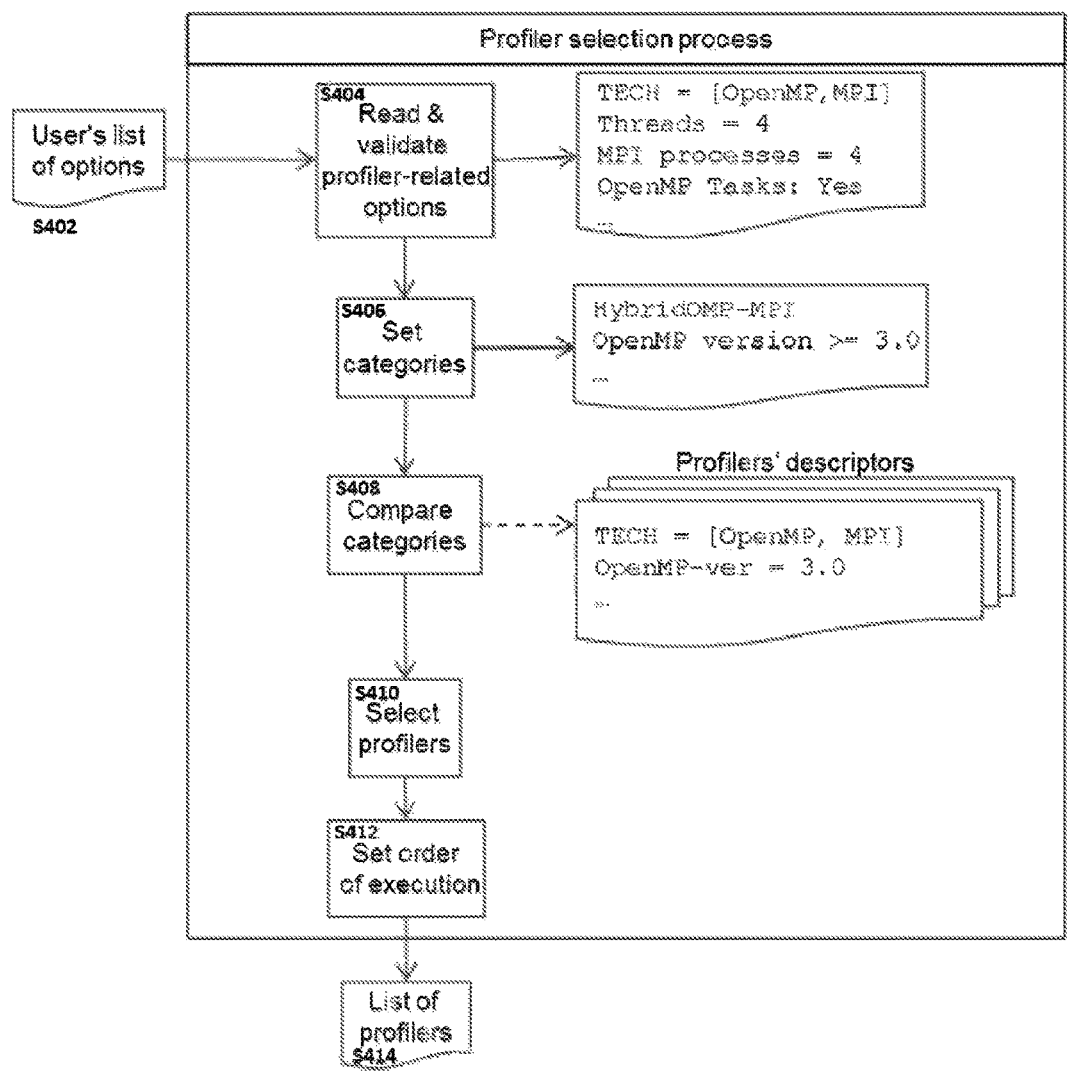
FIG. 4 is a flowchart outlining a procedure for profiler selection.

After the initial parsing stage, profiler selection takes place as illustrated by S404-S414 of FIG. 4. FIG. 4 illustrates a flow chart outlining the profiler selection process and includes examples of categories and profiler features. The profiler selection is exemplary of the processing performed by the profiler matching unit 20.

Profiler selection begins with the categorization of the types of profiling to be performed. The categorization process may be performed by the profiler matching unit 20 which configures the translation unit to translate the profiling execution requirements, specified by the user input information 14, into a plurality of requirement value ranges each representing a profiler feature, as illustrated in S404-S406. Each requirement value range is identified by a requirement information identifier, as illustrated by the S404 where 'TECH', 'Threads', 'MPI processes' and 'OpenMP Tasks' are examples of requirement information identifiers. The categories, represented by the requirement information identifiers, within this categorization process can include, for example, distributed memory, shared memory, hardware description, hardware performance counters, accelerators, tracing and so forth.

Once these requirement information identifiers are set, and therefore the categories have been determined in S406, they are compared against and matched to the profiler specifications 18 by the profiler matching unit 20 in S408. The profiler matching unit 20 identifies an appropriate list of potential profilers to be used in step S410, which is also implicitly contrasted against the available licenses for each application profiler and corresponding system of hardware resources 24. This list of potential profilers to be used is determined by the profiler matching unit 20 whereby the respective profiler specifications 18 are compared to the specified profiling execution requirements by comparing value ranges for associated profiler information identifier-requirement information identifier pairs. As a result, an order of execution for the list of all available profilers is obtained in S414.

The profiler specifications (and hardware artifact maps) are implemented as different files that contain all the required information for a given application profiling task being executed on a target system of hardware resources 25. The profiler descriptors follow a 'key-value' structure, whereby each of the various profiler features is identified by a profiler information identifier and each profiler information identifier has a corresponding profiler value range. For example, in order to describe a profiler which is able to profile both OpenMP and MPI applications, the corresponding profiler descriptor would contain the following line, where the key is represented by 'TECH' and the values are represented by 'OpenMP' and 'MPI':

TECH=[OpenMP, MPI]

The same profiler structure is then followed for describing any other added information including, for example, paths to dependent libraries, such as specified software artifacts, and the different performance features measured by the application profiler. The profiling matching unit 20 then reads and matches requirement information identifiers to the profiler information identifiers in order to decide which profiler will be used for profiling a particular application and experiment. For example, when profiling the execution of a hybrid OpenMP/MPI application the user may be required to set how many OpenMP threads and how many MPI processes will be used when executing the profiling target, as shown in FIG. 4. This information, together with any other user input information 14, is monitored and used when comparing requirement information identifiers against profiler information identifiers in the profiler matching unit 20. Therefore, in this particular case, the application profiling job management system 10 would detect that threads and processes are to be used. As a result, the profiler matching unit 20 applies the requirement information identifier of hybrid OpenMP/MPI to the profiling experiment. This requirement information identifier is then compared with the corresponding key-value in each profiler specification 18, as shown in FIG. 4. The profiler matching unit 20 then identifies the requirement information identifier as having requirement value ranges of OpenMP and MPI, and searches for profilers having corresponding profiling value ranges matching OpenMP and MPI. The profiler matching unit 20 therefore automatically selects matching application profilers. This process is repeated for each requirement information identifier until those profilers that satisfy all categories are selected.

Embodiments also allow each of the application profilers to be easily updated by utilizing individual template based driver scripts for each application profiler. The individual template based driver scripts follow a well-defined structured format for providing instructions to determine the configuration and prerequisites required to load the application profilers and the required software artifacts, execute profiler matching by the profiler matching unit 20 and perform the execution of profiling jobs performed by the job scheduler 26, it is also possible to extend the list of available profilers for use by simply creating a new template based driver script specific to each newly added application profiler.

Figure 5:
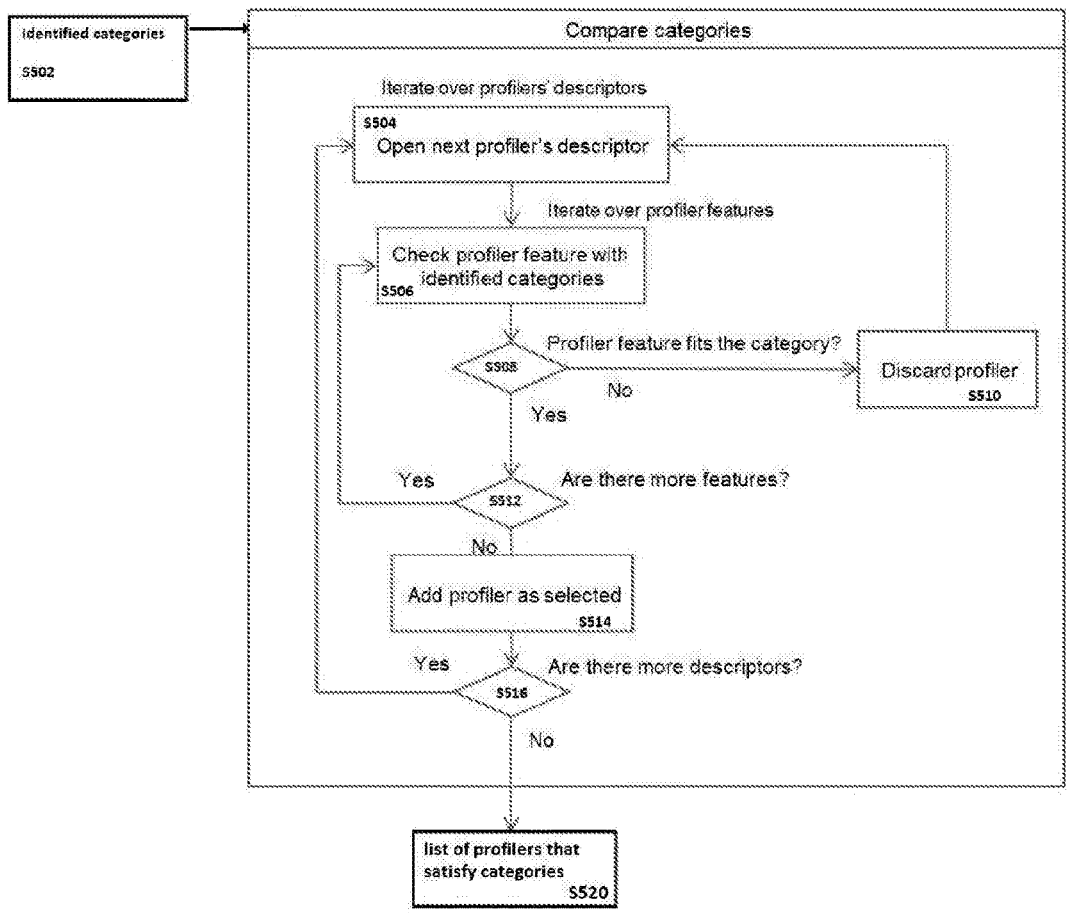
FIG. 5 is a flowchart showing compilation of a list of profilers for a profiling job.

FIG. 5 is a flow chart illustrating step S408 'compare categories' of FIG. 4. At step S502 the requirement information identifiers (which may be referred to as identified categories), translated from the profiling execution requirements by the translation unit, are identified. Each profiler specification 18 (profiler descriptor) is accessed from the profiler specification storage unit 16, at step S504, and passed to step S506 where the profiler specifications 18 are checked against the profiler execution requirements, input by the user, by comparing profiler information identifiers against requirement information identifiers. At step S508 it is determined whether or not a profiler information identifier (which may be referred to as a profiler feature) matches a requirement information identifier (which may be referred to as the category). If a profiler information identifier does not match a requirement information identifier, the application profiler corresponding to that particular profiler information identifier is discarded at step S510, and the process returns to step S504. If the profiler information identifier does match a requirement information identifier, the process checks whether that particular profiler has any more profiler information identifiers, and if there are more profiler information identifiers still to be checked the process returns to step S506. At step S512 it is determined whether or not there are any more profiler information identifiers (which may be referred to as features) to be checked. If it is determined that there are no more profiler information identifiers to be checked, at step S512, the process continues to step S5014 where that particular application profiler is added to the list of application profilers that satisfy a requirement information identifier. At step S516 a check is carried out as to whether or not there are more profiler specifications 14 to be checked, and if so the process returns to step S504, otherwise the process finishes at S520 where a final list of application profilers that satisfy a requirement information identifier is constructed.

Figure 6:
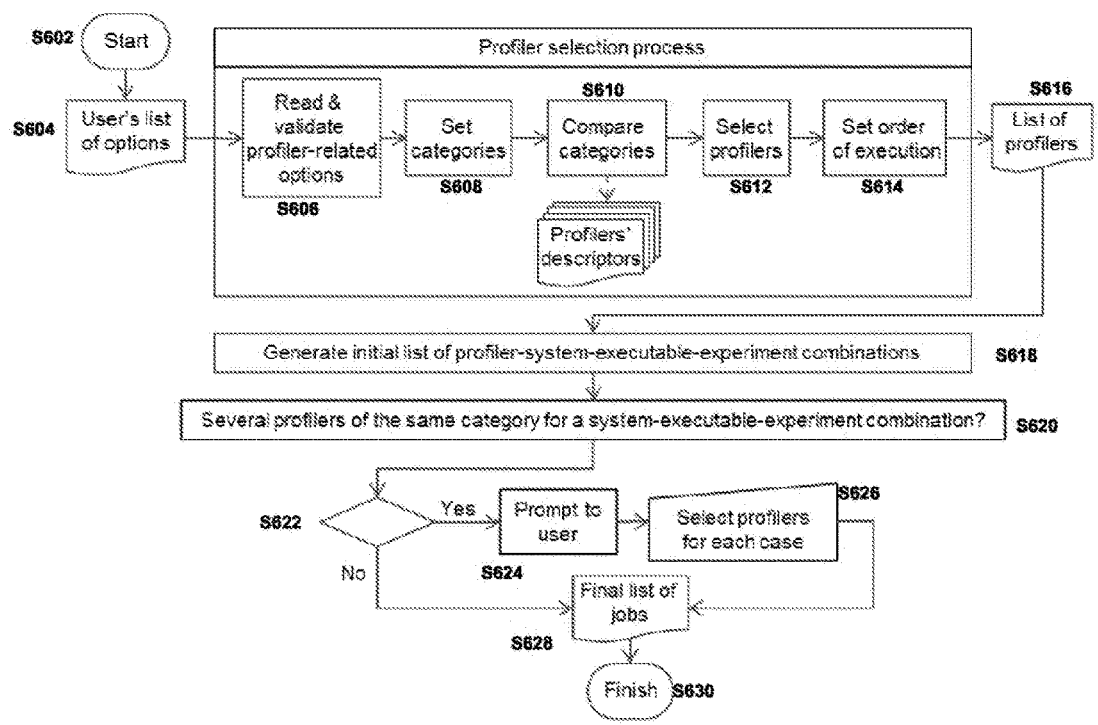
FIG. 6 is a flowchart illustrating profiler selection.

FIG. 6 is a flow chart illustrating where profiler selection takes place within an embodiment of the application profiling job management system 10 as a whole. The profiler selection process of FIG. 6 is exemplary of the functionality of the profiler matching unit 20.

The order of execution for the list of all available profilers may depend on a priority value given in the respective profiler specification 18. These priority values are determined by the person who has control over the profiler specifications 18 (for example, a system administrator). Therefore, certain profilers may have higher priorities than others and therefore will be selected for execution first. This priority can be due to either operational requirements (preferences and/or performance) or otherwise due to errors produced whenever a selection of suitable profilers is not executed in the correct order, which may occur due to profiler interdependencies. Also, if more than one profiler has the same priority value the order of execution may be selected randomly or defaulted to the reading order of the profiler descriptors (profiler specification), for example, in alphabetic order.

At step S602 the profiler selection process being carried out by the profiler matching unit 20 begins. The user input information 14 (which may be referred to as user options) is received at step S604, and then passed onto step S606 where the profiling execution requirements are evaluated. At step S608 the translation unit translates the profiling execution requirements into a plurality of requirement value ranges. The plurality of requirement value ranges are received at step S610 at which point the profiler matching unit 20 compares requirement value ranges against all available profiler information identifiers from the respective profiler specifications 18. At step S612 all application profilers determined to have profiling value ranges that fulfill the identified requirement value ranges for each requirement information identifier are selected. At step 614 the job scheduler 26 determines an order of execution for the one or more application profiling tasks and a list of selected profilers is created at step S616. After a list of profilers is created at step S616 an initial list of application profiling tasks (which may be referred to as profiler-system-executable-experiment combinations) is created at step S618.

The resulting list of profilers is then checked in order to determine if any two application profilers have been selected for the same profiling purpose (i.e. for extracting the same category of information defined by the profiling execution requirements), at step S620. At step S622, if it is determined whether two application profilers have been selected for the same profiling purpose, the application profiling job management system 10 continues to step S624 where the user is prompted to decide which application profiler they would prefer to use. The user subsequently selects the preferred application profiler at step S626 and a final list of one or more application profiling tasks is created at step S628. At step S630 the profiler selection process finishes.

Figure 7:
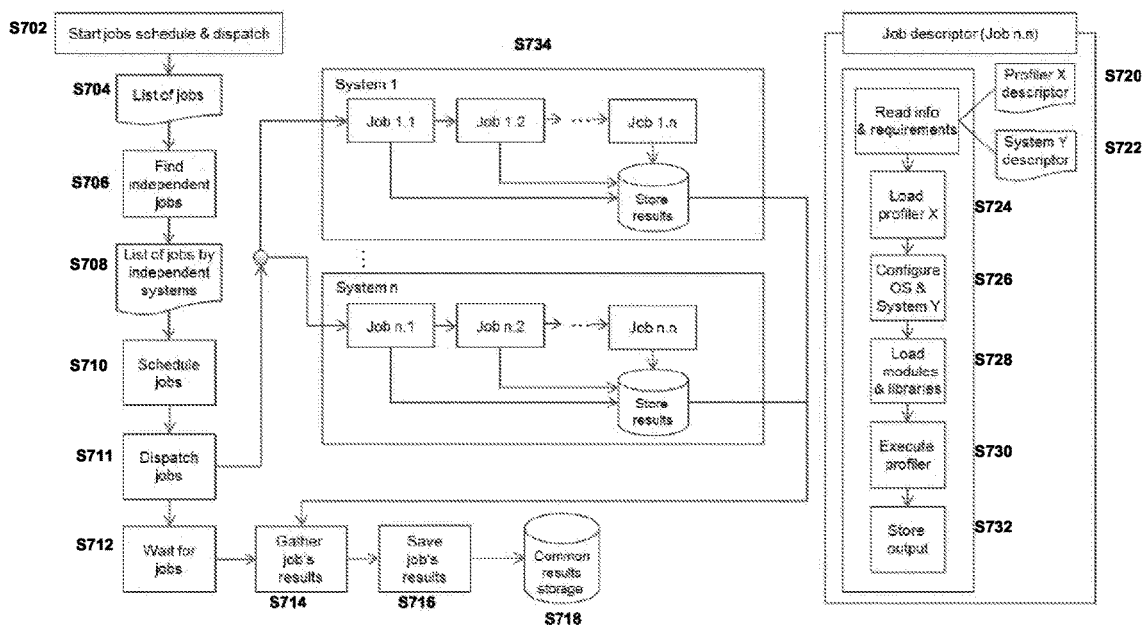
FIG. 7 is a flowchart illustrating the process of scheduling and dispatching jobs by a job scheduler.

FIG. 7 is a flow chart illustrating the process of job scheduling by the job scheduler 24 and the dispatching of said jobs to the systems of hardware resources 24.

At step S702 the process of initiating and executing the one or more application profiling tasks begins. Once the list of suitable application profilers has been produced, jobs are created for all application profiling tasks (which may be referred to as profiler-system-application-experiment combinations) at step S704. A profiler-system-application-experiment combination may include the appropriate instance of the profiling target, the experiment settings represented by the profiling execution requirements and/or the one or more system of hardware resources 24 to be used, where the user can choose to profile the profiling target only, the system(s) of hardware resources 24 only or both. The hardware matching unit 22 proceeds to divide the plurality of application profiling tasks into one or more batch jobs, where each batch job includes application profiling tasks that have been identified as interacting, at step S706. Independent systems of hardware resources are selected at step S708, and at step S710 each batch job (which may be referred to as a list of jobs) is assigned one or more of the independent systems of hardware resources from the one or more computing environments and/or processors. The final list of batch jobs at step S710 includes all combinations of profiler-system-application-experiments that result from the user's initial settings. These batch jobs can be run in parallel for cases where the systems of hardware resources 24 used are independent in operation, otherwise their execution is serialized. Therefore, systems of hardware resources 24 performing parallel execution of the application profilers will not have any interactions between each other that could affect the result of the profiling process. For example, if a batch job is to be executed on System A whilst another batch job is to be executed on System B and both systems A and B do not share resources then both batches can be independently executed in parallel. Batch jobs are dispatched for execution at step S711 and executed between steps S720 and S732 which are discussed in more detail below. The application profiling job management system 10 pauses at step S712 and waits for all batch jobs to complete. Upon completion the results of each batch job are collected at step S714 and stored at step S716. The results of all completed batch jobs are stored in a common location at step S718.

In order to execute an application profiling task, corresponding hardware artifact maps (system descriptors) and profiler specifications (profiler descriptors) are firstly read at steps S720 and S722. These descriptors (i.e. the hardware artifact maps and profiler specifications) allow for extracting all the necessary information, requirements and locations of specified software artifacts (dependent software). The appropriate application profiler is then loaded at step S724, which may also require setting up the correct path for the required binaries and scripts. The necessary settings and requirements for an application profiler's execution are therefore configured via the profiler's specification (profiler's descriptors). Similarly, using the hardware artifact maps (systems descriptors), the paths, operating system requirements and the loading of the appropriate modules and libraries are also configured at steps S726 and S728. As a result, the necessary environmental variables are also set. Once all the settings are complete, the profiler is executed at step S730 and the output is stored at S732. Step S734 illustrates a collection of application profiling tasks being executed as part of a batch job on a particular system of hardware resources, where the number of systems of hardware resources shown in step S734 is indicative of the number of batch jobs being processed by the application profiling job management system 10. On each system of hardware resources, these batch jobs are locally executed in series, and the outcome of each batch job is extracted and stored for global access at step S718.

It is often necessary to load certain software libraries before certain application profilers can be executed, and therefore the appropriate locations for such software libraries must be configured in order to find them on the relevant system of hardware resources. These libraries, and/or any other software, are considered dependencies for the profiler (i.e. specified software artifacts). The location of these libraries are stored in each hardware artifact map (system descriptor), where each system of hardware resources could have the same library stored in a different location. As a result, the hardware artifact map (system descriptors) is used to extract the locations of these specified software artifacts (dependent libraries) in a seamless manner.

Each of the profiler specifications (profiler descriptors) contain the various features an application profiler is able to measure and extract from an application. The profiler specifications (profiler descriptors) also contain information on the application profiler information identifiers, the mechanisms for the application profiler usage and details of how to match application profilers with the requirement information identifier provided by the user. In addition, the profiler specifications (profiler descriptors) also contain the path to every library or piece of software a profiler depends on (specified software artifacts), and therefore enables the application profiler to locate any specified software artifact (dependent software) when it is needed.

Figure 8:
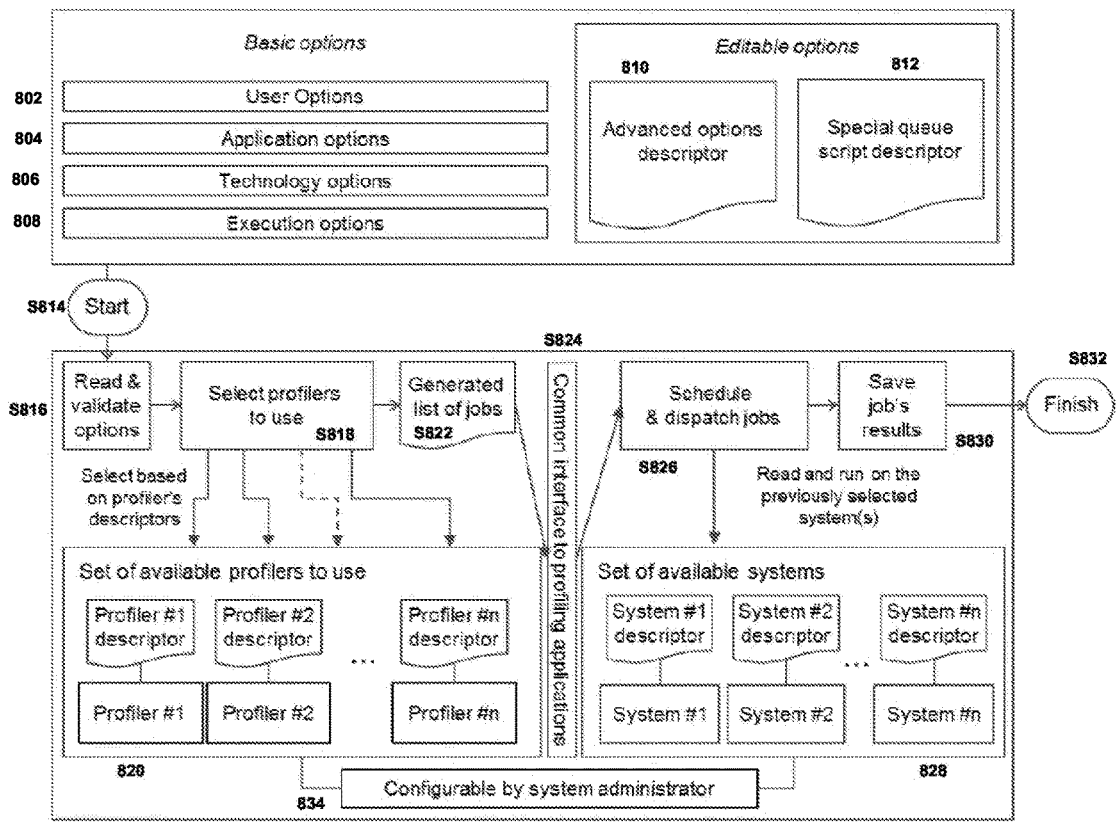
FIG. 8 is a flowchart of a process carried out.

FIG. 8 is a flow chart illustrating an embodiment of the overall process for selecting application profilers, job scheduling and job dispatching, and demonstrates an overview of the entire automated profiling process carried out by the application profiling job management system 10.

Parts 802 to 812 of FIG. 8 illustrates an example of basic options and editable options available to the user as user input information 14 that is sent to the user input receiver 12 for parsing. The basic options of the user input information 14 include: 802 user options, 804 application options, 806 technology options and 808 execution options. The editable options of the user input information 14 include: 810 advanced options descriptor and 812 special queue script descriptor.

Step S814 of FIG. 8 illustrates the start of the application profiling job management system process, wherein the user input information 14 is read and validated at S816 during the parsing process. The profiler specifications 18, at 820, are then accessed by the profiler matching unit 20 at S818 in order to select the appropriate profiler to perform profiling of the profiling target, after which a list of jobs is generated at S822 and passed to the job scheduler 26 via the common interface at S824. The job scheduler proceeds to schedule a list of jobs at S826, after which the job scheduler 26 dispatches each job based on the pool of systems of hardware resources 24 available to the application profiling job management system 10 at 828. Finally, results of each completed job are stored at S830 and the process finishes at S832. The pool of available application profilers at 820 and systems of hardware resources at 828 may be configurable by a system administrator.

In a specific embodiment, a HPC programmer has developed a C++ code, where the C++ code is the profiling target comprising the software application, using a hybrid OpenMP-MPI parallelization for a matrix-matrix multiplication algorithm. The programmer would like to profile this profiling target in order to get a complete report on its performance. The programmer would also like to obtain information on the systems of hardware resources 24 the application is being executed on, including hardware and software details such as CPU information, memory size and type, cache and Translation Lookaside Buffer (TLB) levels, and libraries installed. Extracting all this information requires the user to apply different profiling and operating system tools, which typically involves a steep learning process on how to use them properly.

In this scenario, the HPC programmer would like to profile the profiling target with an OpenMP application profiler, such as ompP; an MPI application profiler, for example IPM; an application profiler that reads multiple hardware performance counters, for example PerfSuite. In addition, the programmer may need to make use of some operating system commands in order to extract hardware and software information (specified software artifacts), such as HWLOC, psinv (from PerfSuite), and read data from some system files such as /proc/cpuinfo, which contains information on the CPU of the underlying computing system.

Without access to an embodiment, the HPC programmer will need to learn how to use each profiling technology as well as execute them separately. Instead, using an embodiment, the HPC programmer only needs to make use of a single command in order to send user input information 14 to the user input receiver 12 at step, as the following:
>-i MPIOMP -processes 8 -threads 4 -dataset 1000 -datalabel "1000×1000"-location experiment/results -systeminfo MM.exe In this specific embodiment, this command executes a 1000×1000 matrix-matrix multiplication, launching 8 MPI processes, and 4 OpenMP threads per process, while setting a label for the experiment and the location to store the resulting profiling data. Therefore, the application is profiled by omP, IPM, and PerfSuite, and information on the system is extracted by executing HWLOC, psinv, and reading /proc/cpuinfo.

As a result, profiling data is stored into the folder 'experiment/results', which contains a separate folder for each job. This folder contains the necessary information to obtain a complete and comprehensive profile of the profiling target, as well as the underlying system of hardware resources 24.

Figure 9:
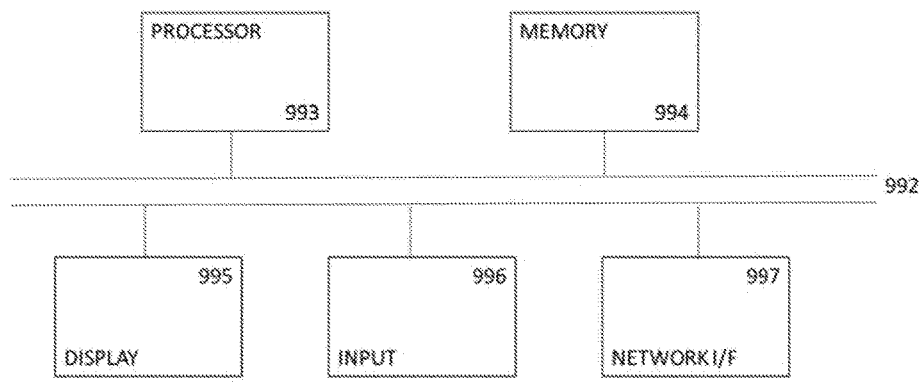
FIG. 9 is a hardware architecture of an embodiment.

FIG. 9 is a block diagram of a computing device, such as an application profiling job management system which may be used to implement a method of an embodiment. The computing device comprises a processor 993, and memory, 994. Optionally, the computing device also includes a network interface 997 for communication with other computing devices, for example with other computing devices of the embodiments.

For example, an embodiment may be composed of a network of such computing devices. Optionally, the computing device also includes one or more input mechanisms such as keyboard and mouse 996, and a display unit such as one or more monitors 995. The components are connectable to one another via a bus 992.

The memory 994 may include a computer readable medium, which term may refer to a single medium or multiple media (e.g., a centralized or distributed database and/or associated caches and servers) configured to carry computer-executable instructions or have data structures stored thereon. Computer-executable instructions may include, for example, instructions and data accessible by and causing a general purpose computer, special purpose computer, or special purpose processing device (e.g., one or more processors) to perform one or more functions or operations. Thus, the term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media. By way of example, and not limitation, such computer-readable media may include non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices).

The processor 993 is configured to control the computing device and execute processing operations, for example executing code stored in the memory to implement the various different functions of the user input receiver 12, profiler specification storage unit 16, profiler matching unit 20, hardware management unit 22 and job scheduler 26 described here and in the claims. The memory 994 stores data being read and written by the processor 993. As referred to herein, a processor may include one or more general-purpose processing devices such as a microprocessor, central processing unit, or the like. The processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor may also include one or more special-purpose processing devices such as an application specific integrated circuit (ASIC), a field programmable gate array (FPGA), a digital signal processor (DSP), network processor, or the like. In one or more embodiments, a processor is configured to execute instructions for performing the operations and steps discussed herein.

The display unit 997 may display a representation of data stored by the computing device and may also display a cursor and dialog boxes and screens enabling interaction between a user and the programs and data stored on the computing device. The input mechanisms 996 may enable a user to input data and instructions to the computing device. The network interface (network I/F) 997 may be connected to a network, such as the Internet, and is connectable to other such computing devices via the network. The network I/F 997 may control data input/output from/to other apparatus via the network. Other peripheral devices such as microphone, speakers, printer, power supply unit, fan, case, scanner, trackerball etc. may be included in the computing device.

The user input receiver 12 of FIG. 1 may be a processor 993 (or plurality thereof) executing processing instruction (a program) stored on a memory 994 and exchanging data via the data exchange. In particular, the processor 993 executes processing instructions to receive, via the data exchange, the user input information 14 containing the desired user options for executing the one or profiling tasks including the specifies profiling target and the profiling execution requirements, as in steps S202 and S204 of FIG. 2. Furthermore, the processor 993 may execute processing instructions to store the user input information 14 on a connected storage unit and/or to transmit, via the data exchange, the user input information 14 to the user input receiver 12 for processing by parsing.

The profiler specification storage unit 16 of FIG. 1 may be a processor 993 (or plurality thereof) executing processing instruction (a program) stored on a memory 994 and exchanging data via the data exchange. In particular, the processor 993 executes processing instructions to receive, via the data exchange, the profiler specifications 18 each of which includes a plurality of profiler information identifiers identifying a profiling value range for the respective application profilers, as in steps S408 of FIG. 4. Furthermore, the processor 993 may execute processing instructions to store profiler specifications 18 on a connected storage unit.

The profiler matching unit 20 of FIG. 1 may be a processor 993 (or plurality thereof) executing processing instruction (a program) stored on a memory 994 and exchanging data via the data exchange. In particular, the processor 993 executes processing instructions to receive, via the data exchange, the user input information 12 and selected profiler specifications 18 from the user input receiver 12 and the profiler specification storage unit 16, and determine which of the plurality of application profilers satisfy the specified profiling execution requirements, based on the respective profiler specifications 18, and for each of the application profilers determined to satisfy the specified profiling execution requirements, to generate one or more application profiling tasks, as in steps S610 to S618 of FIG. 6. Furthermore, the processor 993 may execute processing instructions to store the list of one or more profiling tasks on a connected storage unit and/or to transmit, via the data exchange, the one or more profiling tasks to the job scheduler 26 to initiate execution of each of the one or more application profiling tasks.

The hardware management unit 22 of FIG. 1 may be a processor 993 (or plurality thereof) executing processing instruction (a program) stored on a memory 994 and exchanging data via a data exchange. In particular, the processor 993 executes processing instructions to receive, via the data exchange, the one or more profiling tasks from the profiler matching unit 20 and select one or more systems of hardware resources 24 and/or processors to perform each of the application profiling tasks, as in steps S707 of FIG. 7. Furthermore, the processor 993 may execute processing instructions to store the list of selected one or more systems of hardware resources to perform each of the application profiling tasks on a connected storage unit.

The job scheduler 26 of FIG. 1 may be a processor 993 (or plurality thereof) executing processing instruction (a program) stored on a memory 994 and exchanging data via data exchange. In particular, the processor 993 executes processing instructions to receive, via the data exchange, the list of one or more systems or hardware resources and/or processors to perform each of the one or more profiling tasks from the hardware management unit 22 and initiate execution of each of the one or more application profiling tasks with the respective selected one or more systems of hardware resources 24, as in steps S710 and S711 of FIG. 7. Furthermore, the processor 993 may execute processing instructions to store the list of one or more systems or hardware resources on a connected storage unit and/or to transmit, via the data exchange, the one or more profiling tasks to the one or more systems of hardware resources 23 for execution.

The data exchange may be the network I/F, or may be an internal data exchange mechanism, such as via a commonly accessible storage location.

The application profiling job management system of FIGS. 1 to 9 may be a processor 993 (or plurality thereof) executing processing instructions (a program) stored on a memory 994 and exchanging data via a data network. In particular, the processor 993 executes processing instructions to receive, via the data network, user input information 14 and profiler specifications 18 and compose and initiate one or more application profiling tasks for profiling a software application, as in steps S202 to S216 of FIG. 2. Furthermore, the processor 993 may execute processing instructions to store the results of the one or more application profiling tasks on a connected storage unit.

Methods of the embodiments may be carried out on a computing device such as that illustrated in FIG. 9. Such a computing device need not have every component illustrated in FIG. 9, and may be composed of a subset of those components. A method of the embodiments may be carried out by a single computing device in communication with one or more data storage servers via a network. The computing device may be a data storage itself storing results from the one or more profiling tasks. Methods of the embodiments may be stored on a non-transitory computer readable storage medium.

A method embodying the present invention may be carried out by a plurality of computing devices operating in cooperation with one another. One or more of the plurality of computing devices may be a data storage server storing at least a portion of the results from the one or more profiling tasks.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An application profiling job management system, configured to compose and initiate one or more application profiling tasks for profiling a software application, the application profiling job management system comprising:
   processing hardware coupled to memory hardware, the memory hardware storing processing instructions which, when executed by the processing hardware, cause the processing hardware to perform a process comprising including:
   receiving user input information, wherein the user input information specifies a profiling target and profiling execution requirements, the profiling target including the software application;
   storing, in a profiler specification storage area of the memory hardware, a profiler specification of each of a plurality of application profilers accessible to the application profiling job management system;
   determining which of the plurality of application profilers satisfy the profiling execution requirements, based on one of respective profiler specifications, and for each of the application profilers determined to satisfy the profiling execution requirements, generating one or more application profiling tasks, each application profiling task specifying an application profiler from among the plurality of application profilers and the profiling target;
   selecting one or more systems of hardware resources to perform each of the application profiling tasks; and
   initiating execution of each of one or more application profiling tasks with the respective selected one or more systems of hardware resources.

2. An application profiling job management system according to claim 1, further comprising: a hardware artifact map storage area of the memory hardware, configured to store, for the one or more systems of hardware resources, a hardware artifact map specifying a location of each of a plurality of software artifacts stored by the respective system of hardware resources;
   the process further comprising:
   assembling, for each application profiling task, a set of software artifacts upon which the specified application profilers indicate a dependency, by using the hardware artifact map for selected system of hardware resources to access the location of the software artifacts.

3. An application profiling job management system according to claim 2, wherein each of the hardware artifact maps includes, for a respective system of hardware resources, one or more hardware storage identifiers linked to data indicating the location of specified software artifacts on a hardware resource to be assembled for execution of the one or more application profiling tasks.

4. An application profiling job management system according to claim 1, wherein
   each of the profiler specifications includes, for a respective application profiler, a plurality of profiler information identifiers each of which identifies a profiling value range one of indicating a performance measurement available from the respective application profiler and indicating one or more software artifacts required by a specified application profiler.

5. An application profiling job management system according to claim 4, wherein determining which of the plurality of application profilers satisfy specified profiling execution requirements includes:
   translating the profiling execution requirements specified by the user input information into a plurality of requirement value ranges, each requirement value range identified by a requirement information identifier, and each requirement information identifier having an associated profiler information identifier; and
   comparing respective profiler specifications to the specified profiling execution requirements by comparing value ranges for associated profiler information identifier- requirement information identifier pairs.

6. An application profiling job management system according to claim 4, wherein determining which of the plurality of application profilers satisfy the specified profiling execution requirements further includes determining which of the plurality of application profilers satisfy the specified profiling execution requirements by:
   for a profiler specification of each application profiler:
      determining whether an associated profiler information identifier identifies a profiling value range that fulfils the requirement value range for each requirement information identifier, wherein an application profiler is determined to satisfy the specified profiling execution requirements when the requirement value ranges are fulfilled.

7. An application profiling job management system according to claim 1, wherein
   the memory hardware is configured to store an application profiler driver script template defining a structured format for instructions determining configuration of a system of hardware resources executing the application profiler; and
   the memory hardware further comprises a driver script storage area configured to store an application profiler driver script for each of the plurality of application profilers accessible to the application profiling job management system, wherein each application profiler driver script implements the structured format defined by the application profiler driver script template.

8. An application profiling job management system according to claim 4, wherein,
   each of the profiler specifications further includes, for an respective application profiler, a priority indicator value for indicating an order in which a group of application profilers should be executed during execution of an application profiling task,
   whereby higher priority indicator values are executed before lower priority indicator values, wherein priority indicator values are based on one of operational requirements and interdependencies between a sequence of application profilers which require some application profilers to be executed earlier in the sequence than other application profilers, and a priority indicator value is configurable by a user.

9. An application profiling job management system according to claim 7, wherein the selecting one or more systems of hardware resources to perform each of the application profiling tasks includes, in a case in which a profiler matching unit determines a plurality of application profiling tasks, the following:
   scanning the plurality of application profiling tasks to identify interactions, and dividing the plurality of application profiling tasks into one or more batch jobs including grouping identified interacting application profiling tasks into a same batch job; and
   selecting one or more systems of hardware resources from one or more computing environments processors to perform each of the application profiling tasks by selecting an independent system of hardware resources for each of the one or more batch jobs.

10. A computing system, comprising:
    an application profiling job management system, configured to compose and initiate one or more application profiling tasks for profiling a software application; the application profiling job management system comprising processor hardware coupled to memory hardware, the memory hardware storing processing instructions which, when executed by the processing hardware, cause the processing hardware to perform a process comprising:
       receiving user input information, wherein the user input information specifies a profiling target and profiling execution requirements, the profiling target comprising the software application;
       storing, in a profiler specification storage area of the memory hardware, a profiler specification of each of a plurality of application profilers accessible to the application profiling job management system;
       determining which of the plurality of application profilers satisfy the profiling execution requirements, based on respective profiler specifications, and for each of the application profilers determined to satisfy the profiling execution requirements, to generate one or more application profiling tasks, each application profiling task specifying an application profiler from among the plurality of application profilers and the profiling target;
       selecting one or more systems of hardware resources processors to perform each of the application profiling tasks; and
       initiating execution of each of one or more application profiling tasks with a respective selected one or more systems of hardware resources; and the computing system further comprising:
       the one or more systems of hardware resources, wherein each of the systems of hardware resources is configured to execute an application profiling task in accordance with instructions of a job scheduler.

11. An application profiling job management method, for composing and initiating one or more application profiling tasks for profiling a software application, the application profiling job management method comprising:
    receiving user input information, wherein the user input information specifies a profiling target and profiling execution requirements, the profiling target comprising the software application;
    storing a profiler specification of each of a plurality of application profilers accessible to the application profiling job management system;

determining which of the plurality of application profilers satisfy the profiling execution requirements, based on respective profiler specifications, and for each of the application profilers determined to satisfy the profiling execution requirements, generating one or more application profiling tasks, each application profiling task specifying an application profiler from among the plurality of application profilers and the profiling target;

selecting one or more systems of hardware resources to perform each of the application profiling tasks; and initiating execution of each of the one or more application profiling tasks with a respective selected one or more systems of hardware resources.

12. A non-transitory computer-readable medium storing a computer program which, when executed by a computing device, causes the computing device to execute a method comprising:

receiving user input information, wherein the user input information specifies a profiling target and profiling execution requirements, the profiling target comprising the software application;

storing a profiler specification of each of a plurality of application profilers accessible to the application profiling job management system; determining which of the plurality of application profilers satisfy the profiling execution requirements, based on respective profiler specifications, and for each of the application profilers determined to satisfy the profiling execution requirements, generating one or more application profiling tasks, each application profiling task specifying an application profiler from among the plurality of application profilers and the profiling target;

selecting one or more systems of hardware resources to perform each of the application profiling tasks; and initiating execution of each of the one or more application profiling tasks with a respective selected one or more systems of hardware resources.

13. A method, comprising:

receiving user input information specifying a profiling target and profiling execution requirements, the profiling target comprising a software application;

determining which of a plurality of application profilers satisfy the profiling execution requirements, based on profiler specifications, and for each of the application profilers determined to satisfy the profiling execution requirements, generating one or more application profiling tasks, each application profiling task specifying an application profiler from among the plurality of application profilers and the profiling target;

selecting one or more systems of hardware resources to perform each of the application profiling tasks; and initiating execution of each of the one or more application profiling tasks with a respective selected one or more systems of hardware resources.

14. A method, comprising:

determining an application profiler of plural application profilers satisfying profiling execution requirements, based on a profiler specification of each of the profilers, and for each of the application profilers satisfying the profiling execution requirements, generating an application profiling task specifying the application profiler from among the plural of application profilers and a software application to be profiled;

selecting a hardware resource to perform the application profiling task; and initiating execution of each application profiling task with the hardware resource.

15. A method according to claim 14, wherein the determining, selecting and initiating are automatically performed upon identification of the software application and the profiling execution requirements by a user, thereby automatically executing a profiler corresponding to the application software with corresponding customized profiling execution requirements.

* * * * *